United States Patent
Hisamatsu

(10) Patent No.: US 7,219,968 B2
(45) Date of Patent: May 22, 2007

(54) CRAWLER SYSTEM AND CRAWLER LINK STRUCTURE

(75) Inventor: Ken-ichi Hisamatsu, Hirakata (JP)

(73) Assignee: Komatsu Ltd., Tokyo (JP)

( * ) Notice: Subject to any disclaimer, the term of this patent is extended or adjusted under 35 U.S.C. 154(b) by 20 days.

(21) Appl. No.: 10/867,213

(22) Filed: Jun. 15, 2004

(65) Prior Publication Data
US 2005/0088042 A1    Apr. 28, 2005

(30) Foreign Application Priority Data
Jun. 16, 2003 (JP) .............................. 2003-170482

(51) Int. Cl.
*B62D 55/26* (2006.01)
(52) U.S. Cl. ....................... 305/198; 305/201; 305/195
(58) Field of Classification Search ................ 305/100, 305/111, 113, 185, 187, 193, 194, 195, 196, 305/198, 200, 201, 53, 59, 202
See application file for complete search history.

(56) References Cited

U.S. PATENT DOCUMENTS

| | | | |
|---|---|---|---|
| 1,446,292 A * | 2/1923 | George | 305/201 |
| 1,485,026 A * | 2/1924 | Gruber | 305/202 |
| 1,487,416 A * | 3/1924 | Whitlock | 305/202 |
| 1,630,089 A * | 5/1927 | Leake | 305/113 |
| 2,743,140 A * | 4/1956 | Bauer, Jr. | 305/59 |
| 2,823,082 A * | 2/1958 | Bauer, Jr. | 305/53 |
| 3,092,423 A * | 6/1963 | Speidel, Jr. et al. | 305/106 |
| 3,333,903 A * | 8/1967 | Orr et al. | 305/53 |
| 3,563,614 A * | 2/1971 | Parks | 305/194 |
| 3,601,454 A * | 8/1971 | Reinsma | 305/105 |
| 3,680,928 A * | 8/1972 | Kraschnewski et al. | 305/196 |
| 3,680,929 A * | 8/1972 | Hnilicka et al. | 305/201 |
| 4,114,958 A * | 9/1978 | Boggs | 305/198 |
| 4,159,857 A * | 7/1979 | Purcell | 305/187 |
| 4,306,753 A * | 12/1981 | Livesay et al. | 305/201 |
| 4,428,625 A * | 1/1984 | Wohlford | 305/108 |
| 4,443,041 A * | 4/1984 | Wohlford | 305/43 |
| 6,354,679 B1 | 3/2002 | Maguire et al. | |
| 2003/0141760 A1* | 7/2003 | Yamamoto | 305/185 |

FOREIGN PATENT DOCUMENTS

JP      2001-347972      12/2001

* cited by examiner

*Primary Examiner*—Russell D. Stormer
(74) *Attorney, Agent, or Firm*—Armstrong, Kratz, Quintos, Hanson & Brooks LLP

(57) ABSTRACT

There is provided a crawler system and a crawler link structure which can be easily assembled and is superior in durability and provided at low cost. The crawler system comprises a crawler 2 in which pairs of opposed right and left links 1a and 1b are endlessly connected. One end of the pair of right and left links 1a and 1b are connected through a cylindrical connection part 3. Middle parts of the pair of right and left links 1a and 1b in the longitudinal direction are connected by an engaging part 4 which engages with a concave tooth 29 of concave-convex teeth 28 of a crawler sprocket 27. The pairs of right and left links 1a and 1b are endlessly connected by inserting connection pins 12 to the connection parts 3.

15 Claims, 10 Drawing Sheets

CRAWLER SYSTEM AND CRAWLER LINK STRUCTURE

BACKGROUND OF THE INVENTION

1. Field of the Invention

The present invention relates to a crawler system and a crawler link structure.

2. Description of the Background Art

As shown in FIG. 9, a track-laying wording vehicle such as a hydraulic shovel comprises a lower traveling body 51, an upper swirling body 52 and a working machine 53 connected to the upper swirling body 52. The lower traveling body 51 comprises a crawler system 54 as a running gear. The crawler system 54 comprises a crawler 55 in which pairs of opposed right and left links are connected endlessly in general (refer to patent document 1: Japanese unexamined Patent Publication No. 2001-347972 (pages 4 to 9, FIGS. 12 and 17)). The crawler 55 is wound around, an idler 56 and a crawler sprocket 57.

According to a crawler disclosed in the patent document 1 and the like, as shown in FIG. 10, ends 61 and 62 of adjacent links 60 in the longitudinal direction overlap with each other and the overlapping ends 61 and 62 of the opposed right and left links 60 are connected, through connecting members 63. In this case, the link 60 comprises a central thick part 64, one end 61 positioned inside and the other end 62 positioned outside. Through holes 65 and 66 are provided in the ends 61 and 62. In addition, through holes 67 are provided in the central thick part 64. A through hole 69 is communicated with a through, hole opening on the side on which a shoe plate 68 is mounted.

In this case, the connecting member 63 comprises a connection pin 70 and a bush fit around the connection pin 70. The links 60 are endlessly connected by inserting the connection pin 70 between the opposed links 60 through the bush 71 in a state in which the ends 61 and 62 of the links 60 overlap with each other on the right and left sides. At this time, both ends of the connection pin 70 are pressed to the through holes 66 of the ends 62 arranged outside of the links 60, and both ends of the bush 71 are pressed to the thorough holes 65 of the ends 61 arranged, inside of the links 60. In addition, the shoe plate 68 is made to overlap with a mounting face of the link 60 and a bolt member 72 is inserted to the through hole provided in the shoe plate 68 and the through hole 69 of the thick part 64 of the link 60, so that the bolt member 72 engages with a nut member 73 provided at the through hole 67 of the thick part 64. Thus, the shoe plate 68 can be mounted on the links 60 connected endlessly. In addition, reference numeral 74 denotes a sealing member in FIG. 10.

Thus, according to the conventional crawler system, the number of parts is large and its assembling workability is low. In addition, since the number of parts is large, its cost is increased and its inventory control of the parts is complicated. In addition, as shown in FIG. 11, since the connecting member 63 engages with a concave tooth 77 of concavo-convex teeth 76 of the crawler sprocket 57, the connecting member 63 receives sprocket loads, so that it is necessary to enhance hardness of the connecting member 63. Furthermore, the center of link motion corresponds to a shaft center of the connecting member 63 at the time of engagement of the crawler sprocket 57. Therefore, the bush 71 of the connecting member 63 rubs against the concavo-convex teeth 76 of the crawler sprocket 57, causing the bush 71 to be damaged. Consequently, its durability is low.

SUMMARY OF THE INVENTION

The present invention was made so as to solve the above conventional problems, and it is an object of the present invention to provide a crawler system and a crawler link structure which can be easily assembled, provided at low cost and superior in durability.

A crawler system comprises a crawler 2 in which pairs of opposed right and left links 1a and 1b are endlessly connected, in which one ends of the pair of the right and left links 1a and 1b are connected through a cylindrical connection part 3, middle parts thereof in the longitudinal direction are connected by an engaging part 4 which engages with a concave tooth of concavo-convex teeth of a crawler sprocket 27, and the pairs of right and left links 1a and 1b are endlessly connected by inserting connection pins to the connection parts 3.

In the crawler system, one end of the pair of the right and left links 1a and 1b are connected through the cylindrical connection part 3, the middle parts thereof in the longitudinal direction are connected through the engaging part 4 which engages with the concave tooth of the concavo-convex teeth of the crawler sprocket 27. Thus, when the crawler system is assembled, since the opposed right and left links 1a and 1b have been connected, the integral right and left links 1a and 1b may be only sequentially connected in the longitudinal direction. Therefore, assembling operations can be simplified. In addition, since the links 1a and 1b are connected at the connection part 3 and the engaging part 4 and the engaging part engages with the concave tooth 29 of the concavo-convex teeth 28 of the crawler sprocket 27, a sprocket load is received by the engaging part 4. Thus, since it is not necessary to insert the pin such as the connection pin in this engaging part 4 unlike the connection part 3, it can be solid instead of being cylindrical. Thus, the hardness of the engaging part 4 can be improved, so that the sprocket load can be stably received. In addition, since the sprocket load is received by the engaging part 4, the connection part 3 may not receive the sprocket load. The connection part 3 can receive tensile force generated when the crawler 2 travels, and may have a bending function when the engaging part 4 engages with the crawler sprocket 27. In addition, the engaging part 4 is not in the center of link motion at the time of engagement of the crawler sprocket 27, and it does not slide with the concavo-convex teeth 28 of the crawler sprocket 27, so that wear is not generated.

A crawler system comprises a crawler 2 in which pairs of opposed right and left links 1a and 1b are endlessly connected, in which one ends of the pair of the right and left links 1a and 1b are connected by a cylindrical connection part 3, middle parts thereof in the longitudinal direction are connected by an engaging part 4 which engages with a concave tooth of concavo-convex teeth of a crawler sprocket 27, and the pairs of right and left links 1a and 1b are endlessly connected by inserting connection pins to the connection parts 3 and the connection parts 3 are not in contact with the concavo-convex teeth 23 of the crawler sprocket 27.

The crawler system, since the connection parts 3 are not in contact with the concavo-convex teeth 28 of the crawler sprocket 27 in addition to the effect above-described, wear caused by the rub of the connection part 3 against crawler sprocket 27 can be avoided, so that the durability can be further improved.

A crawler system comprises a crawler 2 in which pairs of opposed right and left links 1a and 1b are endlessly connected, in which one ends of the pair of the right and left links 1a and 1b are connected by a cylindrical connection part 3, middle parts thereof in the longitudinal direction are connected through an engaging part 4 which engages with a concave tooth of concavo-convex teeth of a crawler sprocket 27, and the pairs of right and left links 1a and 1b are endlessly connected by inserting connection pins to the connection parts 3 and an arrangement pitch, between the adjacent connection parts 3 in the longitudinal direction is longer than an engagement pitch between the engaging parts 4 in a sprocket engaging part.

In the crawler system, since the arrangement pitch between the adjacent connection parts 3 in the longitudinal direction is longer than the engagement pitch between the engaging parts 4 in the sprocket engaging part, if this crawler system and the conventional crawler system (shown in FIG. 10, for example) are used in the same kind and the same size of the construction machine, the longitudinal length of the links 1a and 1b in this crawler system is longer than that of the conventional one. Consequently, the number of links 1a and 1b to be used can be reduced and the number of connecting operations of the links can be reduced, so that assembling workability is improved. Furthermore, as the number of links is reduced, costs can be considerably reduced.

In the crawler system, the engaging part 4 has a face 30 for receiving a shoe plate 21.

In the crawler system, since the shoe plate 21 can be received at the face 30, the load from the shoe plate 21 can be dispersed and the durability as the crawler 2 can be improved.

In the crawler system, the engaging part 4 is provided so as not to correspond to dirt drainage holes 40a and 40b of the shoe plate 21.

In the crawler system, since the engaging part 4 does not correspond to the dirt drainage holes 40a and 40b of the shoe plate 21, the engaging part 4 does not prevent the dirt drainage holes 40a and 40b of the shoe plate 21 from draining dirt or the like. As a result, the dirt or the like can escape from a part between the shoe plate 21 and the links 1a and 1b or the like through the dirt drainage holes 40a and 40b and the crawler 2 can be smoothly driven.

In the crawler system, the pair of opposed right and left links 1a and 1b and the engaging part 4 are constituted by integral molding.

In the crawler system, since the pair of opposed right and left, links 1a and 1b and the engaging part 4 are constituted as a unit by integral molding, they can be cast by integral molding thereby to reduce the cost. Furthermore, torsional rigidity is improved because of the integral molding and a quality is enhanced as a product. In addition, the number of independent parts before assembling is small so that inventory control can be simplified.

In the crawler system, the pair of opposed right and left links 1a and 1b, the connection part 3 and the engaging part 4 are constituted by integral molding.

In the crawler system, since the above components can be constituted by integral molding, the cost can be reduced. In addition, torsional rigidity is improved because of the integral molding and a quality is enhanced as a product. Especially, since the pair of links 1a and 1b, the connection part 3 connecting the links 1a and 1b and the engaging part 4 are integrally molded as a unit, the link structure 5 consisting of the links 1a and 1b, the connection part 3 and the engaging part 4 is superior in hardness arid provides excellent durability as the crawler System. In addition, the number of independent parts before assembling is small so that inventory control can be simplified.

In the crawler system, the links 1a and 1b and the shoe plate 21 can be assembled and dissembled.

In the crawler system, since the links 1a and 1b and the shoe plate 21 can be assembled and dissembled, they can be easily assembled as the crawler system, and when the shoe plate 21 is damaged or the like, the damaged shoe plate 21 can be easily fixed or exchanged.

A crawler link structure comprises a pair of opposed right and left links 1a and 1b, a connection part 3 connecting one ends of the pair of right and left links 1a and 1b, and an engaging part 4 connecting middle parts of the pair of opposed right and left links in the longitudinal direction, in which the engaging part 4 engages with a concave tooth 29 of the concavo-convex teeth 28 of a crawler sprocket 27.

In the crawler link structure, since one ends of the pair of opposed right and left links 1a and 1b are connected through the connection part 3 and the middle parts in the longitudinal direction are connected through the engagement part 4 which engages with the concave tooth 29 of the concavo-convex teeth 28 of the crawler sprocket 27, the opposed right and left, links 1a and 1b have been connected, so that the integral pairs of right and left links 1a and 1b are just sequentially connected in the longitudinal direction when this crawler system is assembled using the crawler link structure. As a result, the assembling operations can be simplified, m addition, since the pair of links 1a and 1b is connected at the connection part 3 and the engaging part 4, and the engaging part 4 engages with the concave tooth 29 of the concavo-convex teeth 28 of the crawler sprocket 27, the sprocket load can be received by the engaging part 4. Since it is not necessary to insert the pin such as the connection pin in this engaging part 4 unlike the connection part 3, it can be solid instead of being cylindrical. Thus, the hardness of the engaging part 4 can be improved, so that the sprocket load can be stably received. In addition, since the sprocket load is received by the engaging part 4, the connection part 3 may not receive the sprocket load. Therefore, since the connection part 3 can receive tensile force generated when the crawler 2 travels, and may have a bending function when the engaging part 4 engages with the crawler sprocket 27, durability of the connection part 3 can be improved.

In the crawler link structure, the pair of right and left links 1a and 1b, the connection part 3 and the engaging part 4 are constituted by integral molding.

Since the crawler link structure can be cast by integral molding, the cost can be reduced. In addition, torsional rigidity is improved because of the integral molding and a quality is enhanced as a product. Especially, since the pair of links 1a and 1b, the connection part 3 connecting the links 1a and 1b and the engaging part 4 are integrally molded, the crawler link structure is superior in hardness and provide excellent durability when the crawler link structure is used in the crawler system.

In the crawler link structure, a shaft center of the connection part 3 and a shaft center of the engaging part 4 are shifted in the diameter direction, in a sprocket engaging part such that the connection part 3 is not in contact with the crawler sprocket 27.

In the crawler link structure, since the connection part 3 is not in contact with the crawler sprocket 27, wear caused rubs of the connection part 3 against the crawler sprocket 27 can be avoided and its durability can be further improved.

DESCRIPTION OF THE PREFERRED EMBODIMENTS

Figure 1:
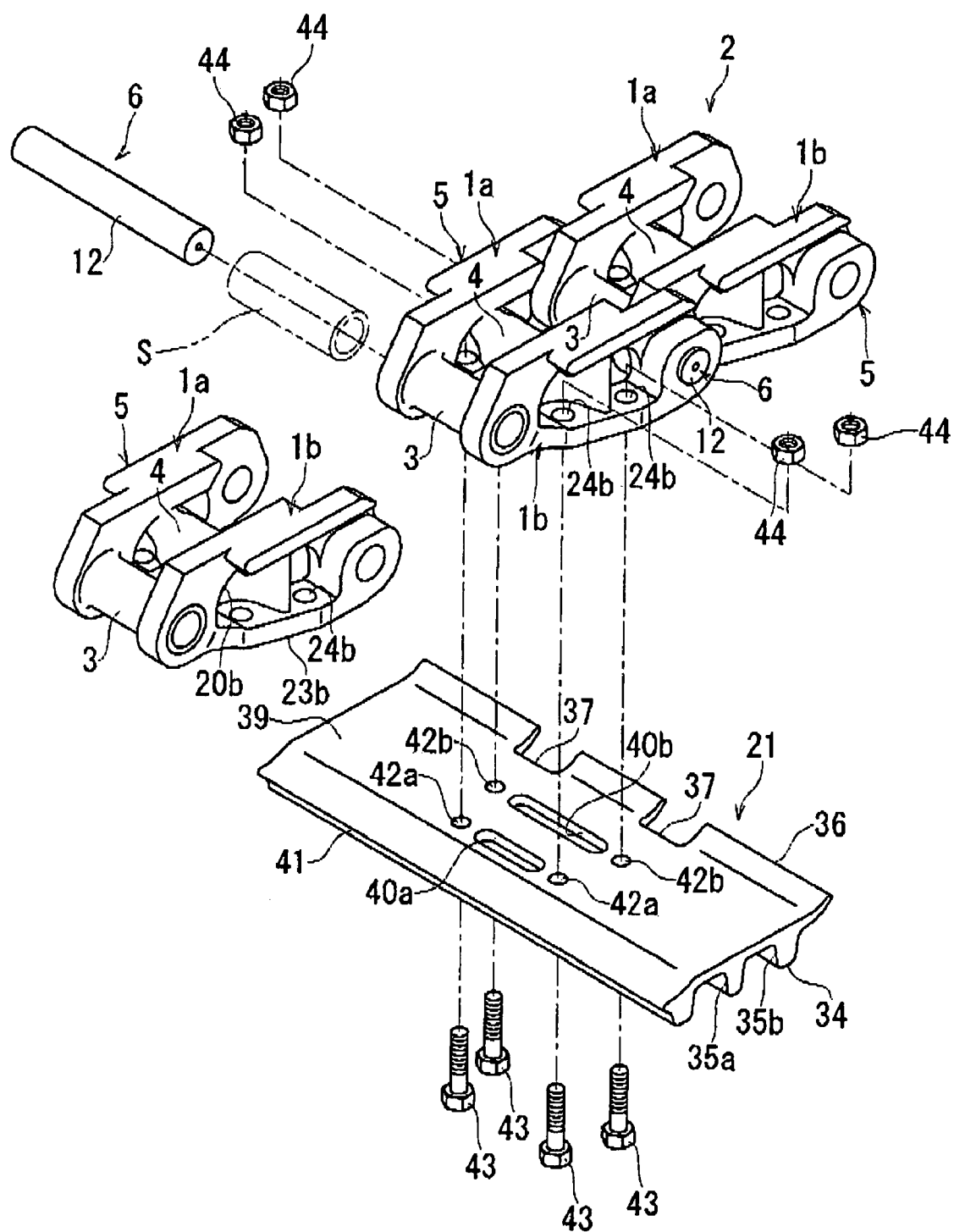
FIG. 1 is an exploded perspective view showing an essential part of a crawler system according to an embodiment of the present invention.
Figure 9:
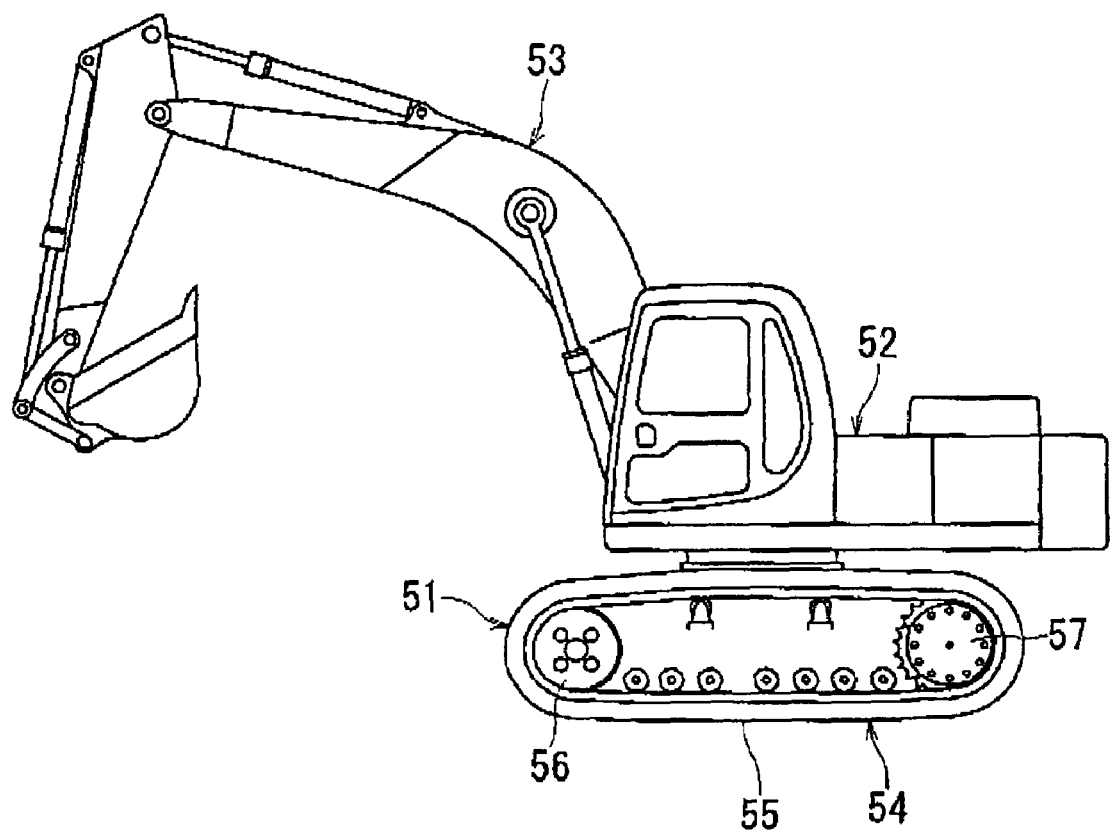
FIG. 9 is a schematic side view showing a construction machine in which the crawler system is used.

A description is made of a concrete embodiment of a crawler-system and a crawler link structure according to the present invention with reference to the drawings. FIG. 1 is an exploded perspective view of an essential part of a crawler system of the present invention. The crawler system is used for a lower traveling body in a construction machine such as a hydraulic shovel shown in FIG. 9.

The crawler system comprises a crawler 2 in which pairs of opposed right and left links 1a and 1b (refer to FIGS. 1 to 3) are connected endlessly. That is, the crawler 2 comprises a crawler link structure 5 consisting of the pair of right and left links 1a and 1b, a cylindrical connection part 3 connecting one end of the links 1a and 1b, and a solid, engaging part 4, connecting middle parts in the longitudinal direction of the links 1a and 1b, and the crawler link structures are endlessly connected through connecting members 6. In this case, the links 1a and 1b, the connection, part 3 and the engaging part 4 are cast by integral molding.

Figure 2:
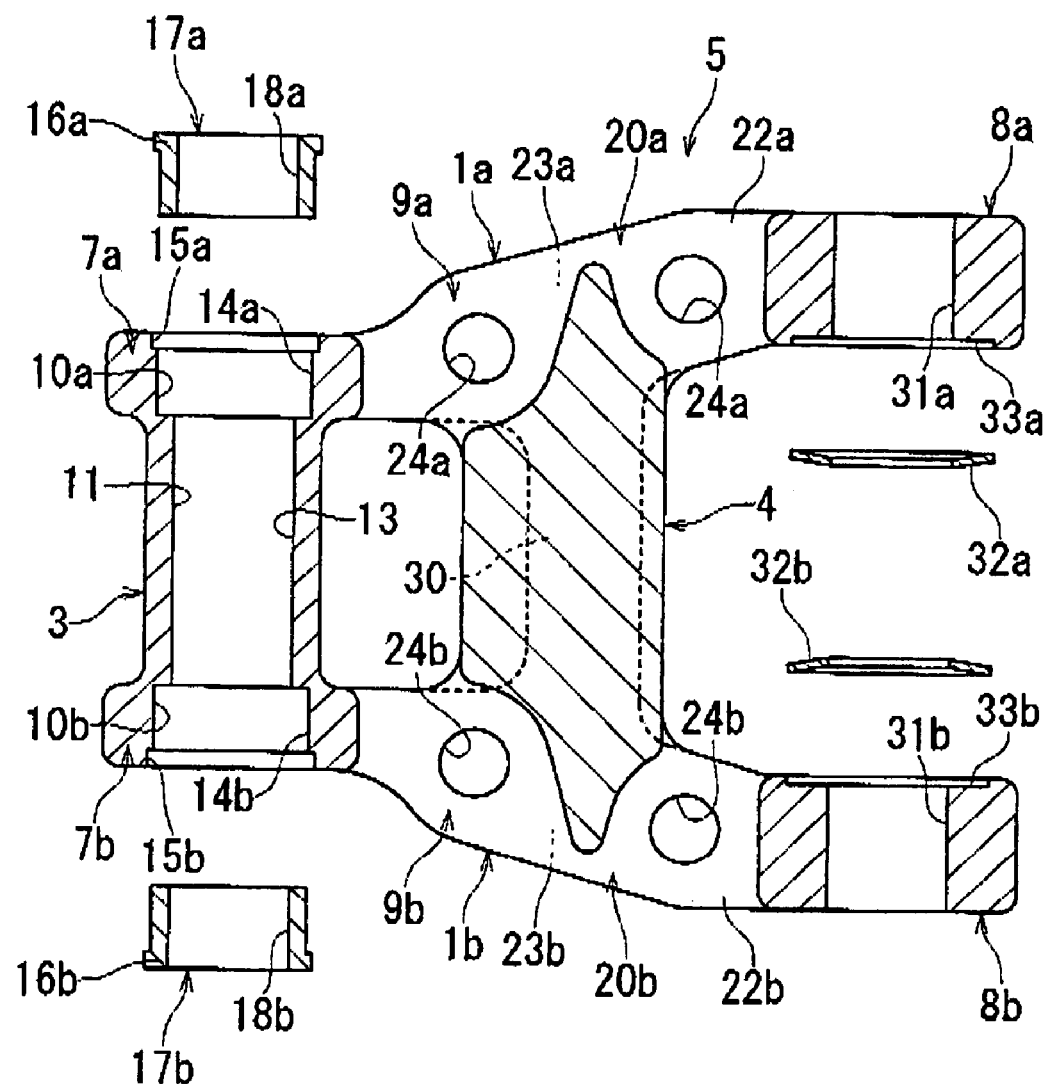
FIG. 2 is a sectional view showing a crawler link structure according to the present invention.
Figure 3:
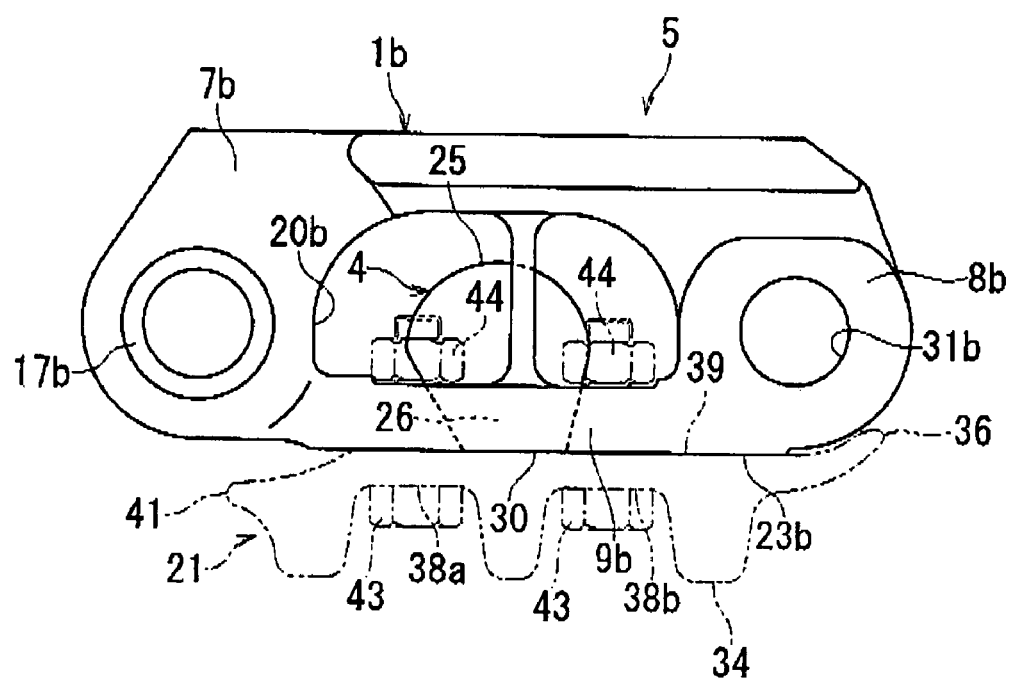
FIG. 3 is a side view showing the crawler link structure.

As shown in FIGS. 2 and 3, the links 1a and 1b of the crawler link structure 5 comprise first parts 7 a and 7b on one end, second parts 8a and 8b on the other end, third parts 9a and 9b connecting the first parts 7a and 7b and the second parts 8a and 8b, respectively, it is assumed that a distance between the second parts 8a and 8b is longer than a distance between the first parts 7a and 7b.

Besides, the opposed first parts 7a and 7b are connected by the connection part 3 and the third parts 9a and 9b are connected by the engaging part 4 in this case, holes 10a and 10b are provided in the first parts 7a and 7b, and the shaft center of each of these holes 10a and 10b coincides with that of the connection part 3. In addition, the holes 10a and 10b comprise body parts 14a and 14b and large diameter parts 15a and 15b of opening parts on the side opposite to the connection part of the body parts 14a and 14b, respectively, in which cylinders 17a and 17b having outer guards 16a and 16b fit, respectively. In this case, the outer guards 16a and 16b fit in the large diameter parts 15a and 15b, respectively. In addition, the inner diameter of the cylinders 17a and 17b is almost the same as the inner diameter of a shaft hole of the connection part 3. Thus, holes 18a and 18b of the cylinders 17a and 17b and the shaft hole 11 of the connection part 3 form a connection hole 13 to which a connection pin 12 (refer to FIG. 1) constituting a connecting member 6 is inserted.

Figure 5:
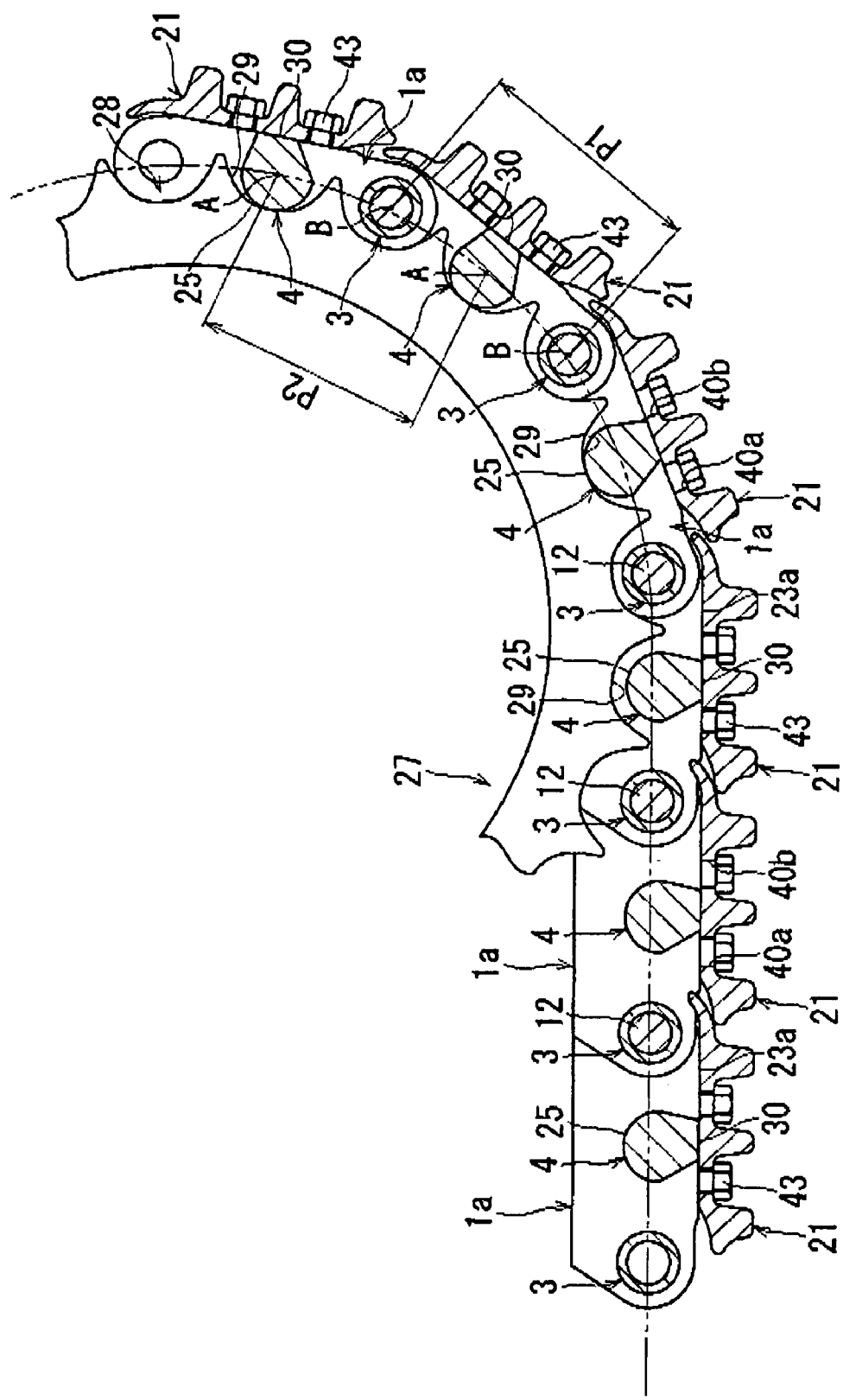
FIG. 5 is a sectional view showing a state in which the crawler system engages with a crawler sprocket.

Holes 20a and 20b are provided in the third parts 9a and 9b of the links 1a and 1b, respectively. Through holes 24a and 24b opening on shoe plate receiving faces 23a and 23b are provided at inner end faces 22a and 22b of the holes 20a and 20b, respectively. In addition, the engaging part 4 comprises a semi-columnar first part 25 and a cross-trapezoidal second, part 26 continued to the first part 25, and the first part 25 fits in a concave tooth 29 of concavo-convex teeth 28 of a crawler sprocket 27 as shown in FIG. 5 as will be described below. In addition, the end of the second part 26 of the engaging part 4 is a plane receiving face 30 continued to the shoe plate receiving faces 23a and 23b of the links 1a and 1b.

Through holes 31a and 31b into which the connection pin 12 is pressed are provided in the second parts 8a and 8b of the links 1a and 1b. Furthermore, concave parts 33a and 33b are formed inner ends of the second parts 8a and 3b and disc springs 32a and 32b serving as sealing members fit in the concave parts 33a and 33b.

Figure 4:
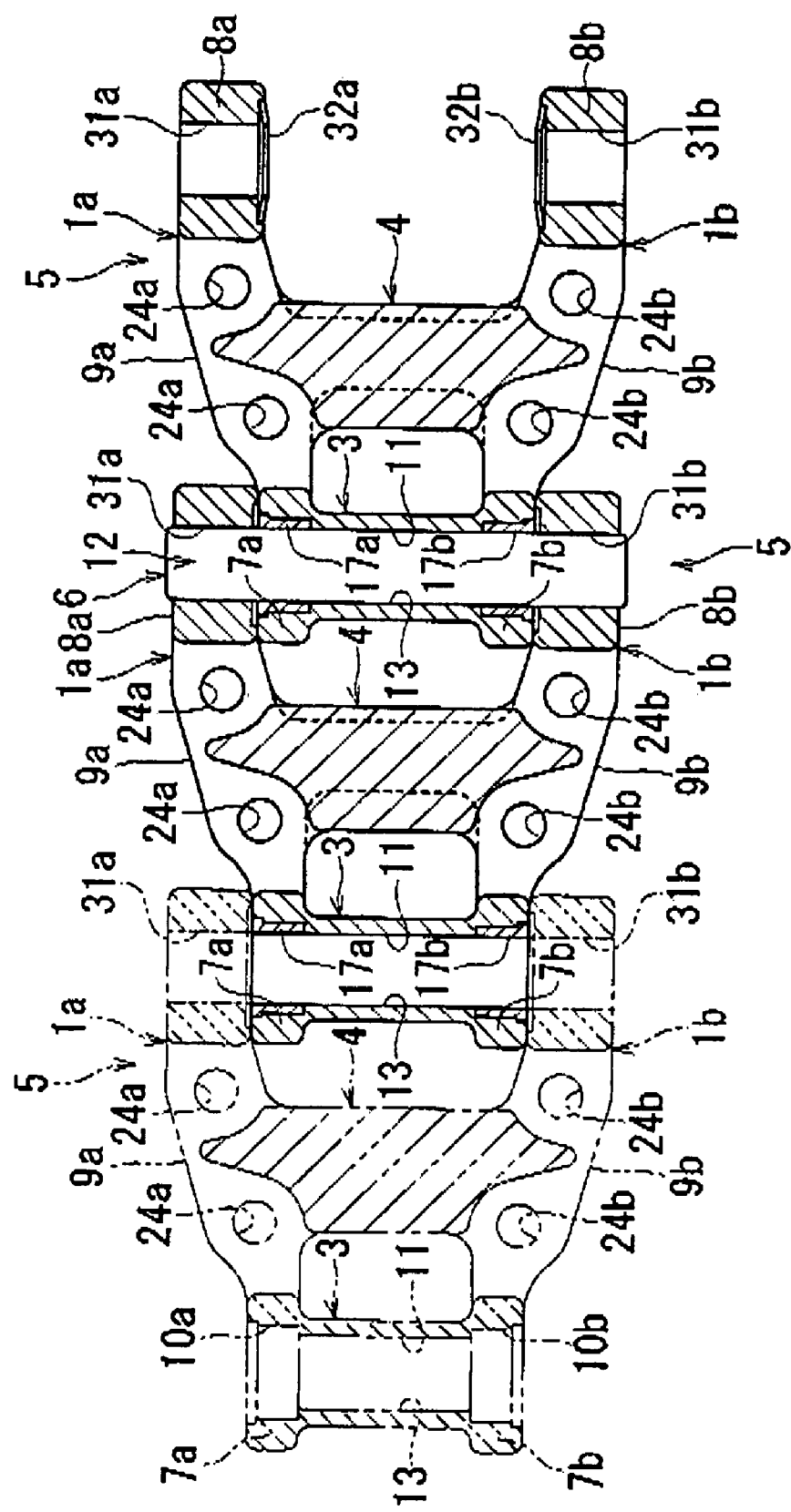
FIG. 4 is a sectional view showing a state in which the crawler link structures are connected.

Thus constituted plurality of crawler link structures 5 are connected through connecting members 6 such that the first parts 7a and 7b of one crawler link structure are inserted to (fit in) a part between the second parts 8a and 8b of another crawler link structure 5 as shown in FIG. 4. More specifically, both ends of the connection pin 12 serving as the connecting member 6 are pressed, into the through holes 31a and 31b of the second parts 8a and 8b of the links 1a and 1b, and its middle part is rotatably inserted into the connection hole 13 of the links 1a and 1b. Thus, the plurality of crawler link structures 5 are endlessly connected, to constitute the crawler 2. Then, as shown in FIG. 1, a shoe plate 21 is mounted on the crawler 2. In addition, a sleeve S shown by a phantom line in FIG. 1 may be pressed in the connection part 3 to which the connection pin 12 is inserted. As this sleeve S, the one hardened to the degree of HRC 45 or more is preferably used. Thus, inner hardness of the connection part 3 can be kept and stable connection can be implemented.

Figure 7:
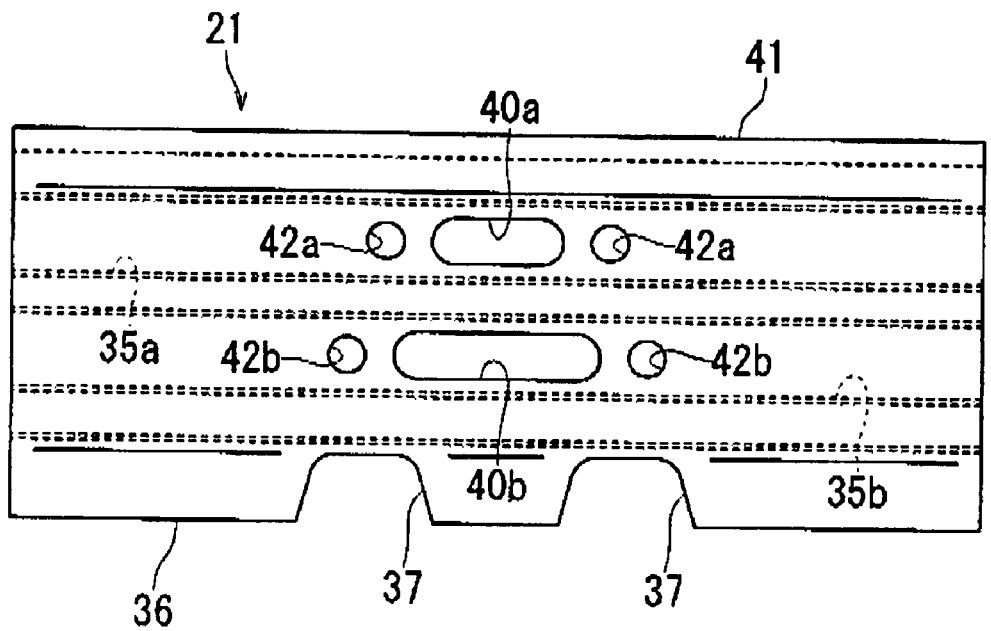
FIG. 7 is a plan view showing a shoe plate of the crawler system.
Figure 8:
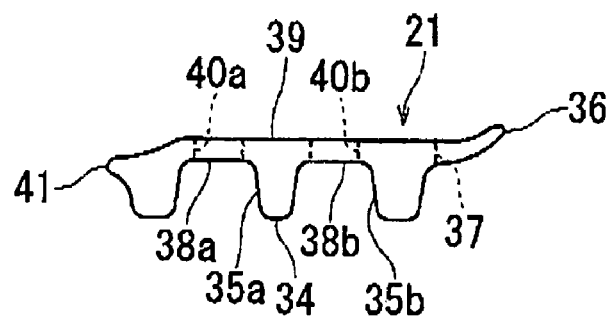
FIG. 8 is side view showing the shoe plate of the crawler system.

Meanwhile, the shoe plate 21 comprises a rectangular plate having a pair of concave grooves 35a and 35b on its front face 34 as shown in FIGS. 1, 7 and 8, and a pair of notches 37 is formed in its rear edge. In addition, dirt drainage holes 40a and 40b of elongate holes opening on its back face 39 are provided in bottom faces 38a and 38Jb of the concave grooves 35a and 35b. In this case, it is assumed that the dirt drainage hole 40b on the side of the rear edge 36 is longer than the dirt, drainage hole 40a on the side of a front edge 41. Through holes 42a and 42b are provided on both sides of the dirt drainage holes 40a and 40b, respectively. Thus, the through holes 42a opens on the bottom face 38a of the concave groove 35a and the through holes 42b opens on the bottom face 38b of the concave groove 35b.

The rear face 39 of the shoe plate 21 is made to overlap with the shoe plate receiving faces 23a and 23b of the links 1a and 1b of the crawler link structure 5 and in this state, bolts 43 are inserted into the through holes 42a and 42b from the side of the front face 34, and into the through holes 24a and 24b of the links 1a and 1b so as to screw in nuts 44 arranged in the holes 20a and 20b of the links 1a and 1b. Thus, the shoe plate 21 can be mounted on the crawler link structure 5.

Thus, the engaging part 4 is arranged between the dirt drainage holes 40a and 40b in the state in which the shoe plate 21 is mounted on the crawler link structure 5, and it does not correspond to the dirt drainage holes 40a and 40b. Therefore, the dirt drainage holes 40a and 40b are not sealed by the engaging part 4 while the receiving face 30 of the engaging part 4 receives the back face 39 of the shoe plate 21.

Figure 6:
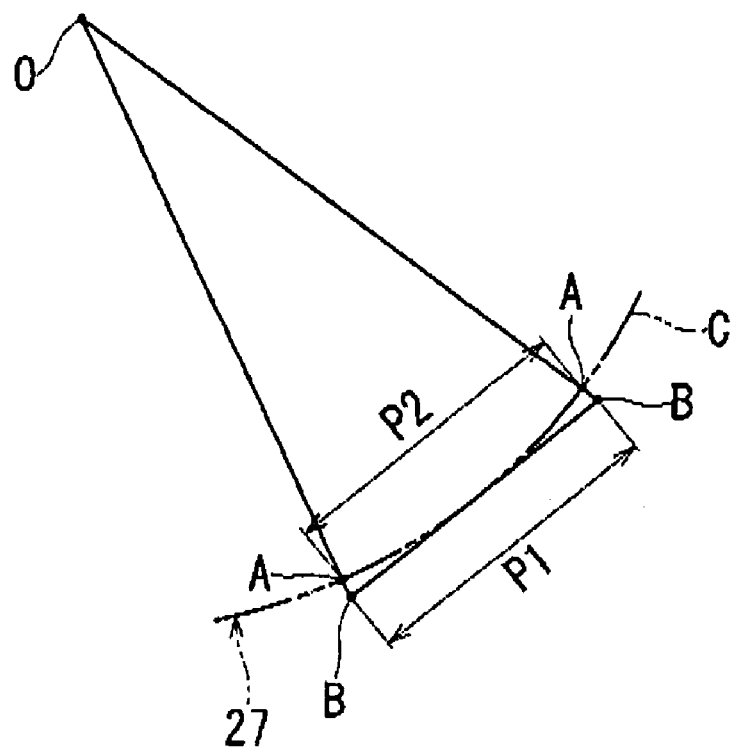
FIG. 6 is an explanatory view showing a relation between an arrangement pitch of connection parts and an engagement pitch of engaging parts in the crawler system.

Meanwhile, the crawler formed endlessly is put on the crawler sprocket 27 and an idler (not shown) as shown in FIG. 5. In this case, it is set such that an arrangement pitch Pi between the connection parts 3 of the adjacent links 1a and 1a (Ib and Ib) in the longitudinal direction is larger than an engagement pitch P2 between the engaging parts 4 in a sprocket engaging part. That is, the engaging pitch P2 is a pitch which engages with the concavo-convex teeth 28 of the crawler sprocket 27 such that engaging shaft center A of the engaging part 4 is positioned on a engaging circle C (pitch circle) of the concavo-convex teeth 28 of the crawler sprocket 27 and the shaft center B of the connection pin 12 is on an extension of the line connecting the engaging shaft center A to a rotation center 0 of the crawler sprocket 27 as shown in FIG. 6. That is, in the sprocket engaging part, the shaft center B and the engaging shaft center A are shifted by arranging the shaft center B of the connection part 3 outside of the engaging shaft center A of the engaging part 4 in the diameter direction. Therefore, the arrangement pitch P1 between connection parts 3 is larger than the engaging pitch P2 between the engaging parts 4.

Since sprocket load is received by the engaging part 4, it is not received by the connection part 3. In addition, since the links 1a and 1b and the connection part 3 are integrally formed, the connection part 3 is superior in hardness, so that a thickness of the connection part 3 can be reduced and an outer diameter dimension of the connection part 3 can be reduced. Consequently, since the shaft center B of the connection pin 12 is positioned, on the extension of the line connecting the engaging shaft center A and the rotation center 0 of the crawler sprocket 27, and the outer diameter dimension of the connection part 3 is reduced, the connection part is off the concave tooth 29 of the, concavo-convex teeth 28 of the crawler sprocket 27 at the sprocket engaging part in the engaged state, so that the connection part 3 is not in contact with the crawler sprocket 27.

According to the crawler system constituted, as described above, since the opposed right and left links 1a and 1b are connected, when this crawler system is assembled, the integral pair of right and left links 1a and 1b are just sequentially connected in the longitudinal direction. As a result, the assembling operation can be simplified. In addition, since the pair of links 1a and 1b is connected at the connection part 3 and the engaging part 4, and the engaging part 4 engages with the concave tooth 29 of the concavo-convex teeth 28 of the crawler sprocket 27, the sprocket load is received by the engaging part 4. Since it is not necessary to insert the pin such as the connection pin in this engaging part 4 unlike the connection part 3, it can be solid instead of being cylindrical. Thus, hardness of the engaging part 4 is improved, so that the sprocket load can be stably received. In addition, since the sprocket load is received by the engaging part 4, the connection part 3 may not be received by the connection part 3. Therefore, since the connection part 3 can receive tensile force generated when the crawler 2 travels, and may have a bending function when the engaging part 4 engages with the crawler sprocket 27, durability of the connection part 3 can be improved.

Figure 10:
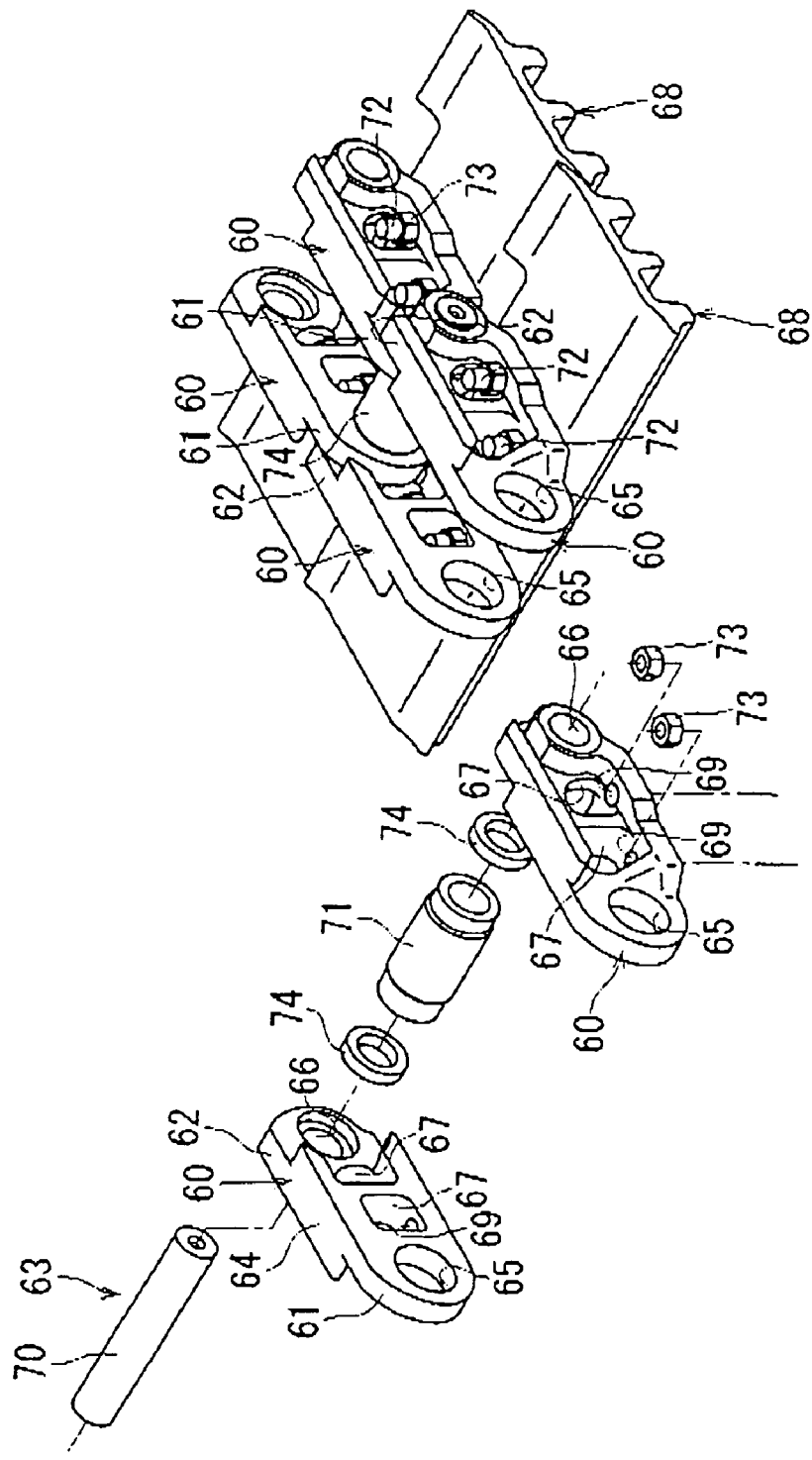
FIG. 10 is an exploded perspective view showing an essential part of the conventional crawler system.
Figure 11:
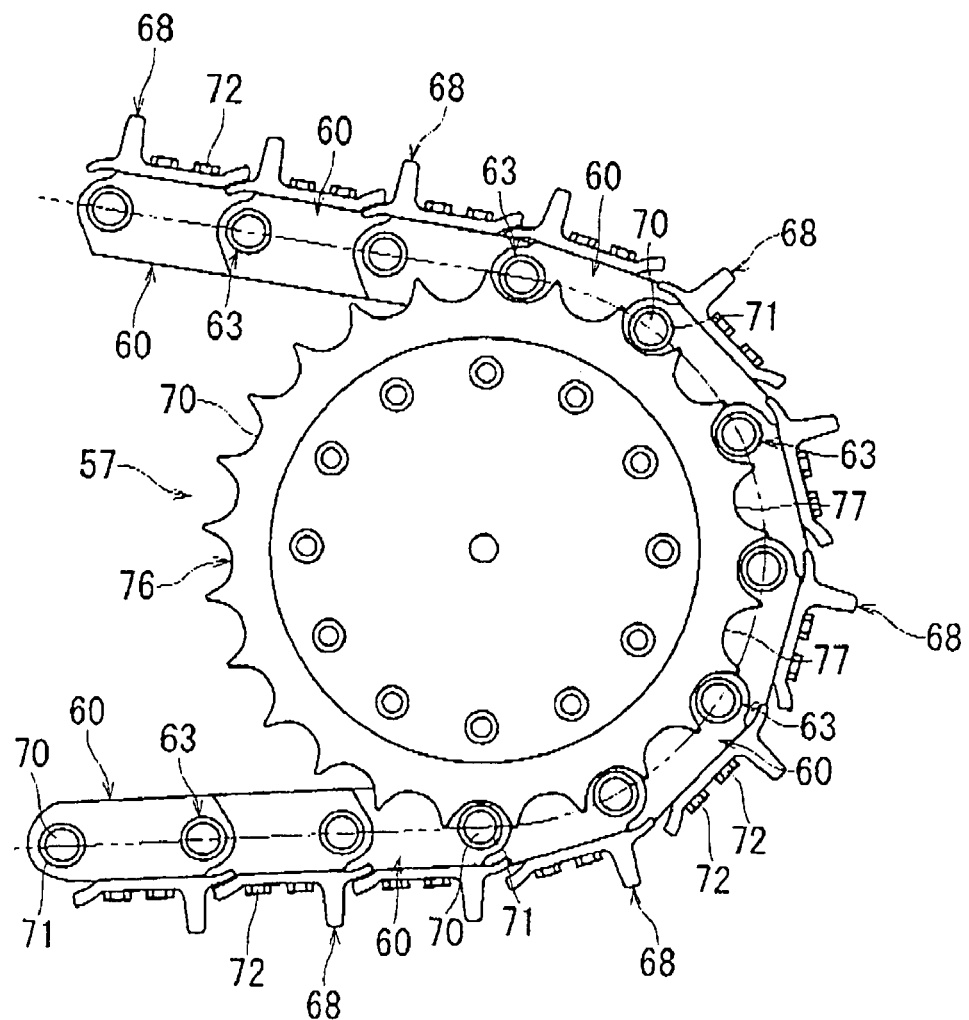
FIG. 11 is a side view showing an engaged state of the crawler sprocket in the conventional crawler system.

Furthermore, since the connection part 3 is not in contact with the concavo-convex teeth 23 of the crawler sprocket 27, wear caused when the connection part 3 rubs against the crawler sprocket 27 can be avoided, so that the durability can be further improved. In addition, since the arrangement pitch P1 of the connection parts 3 adjacent to each other in the longitudinal direction is larger than the engagement pitch P2 of the engaging parts 4 in the sprocket engaging part, when this crawler system and the conventional crawler system (shown in FIG. 10, for example) are used in the same kind and the same size of the construction machine, the longitudinal length of the links 1a and 1b in this crawler system can be longer than that of the conventional one. Consequently the number of links 1a and 1b to be used can be reduced and the number of connecting operations for the links can be reduced, so that assembling workability is improved. Furthermore, as the number of links is reduced, costs can be considerably reduced.

Besides, since the shoe plate 21 can be received on the receiving face 30 of the engaging part 4, load, from the shoe plate 21 can be dispersed, so that durability as the crawler 2 can be improved. In addition, since the engaging part 4 does not correspond to the dirt drainage holes 40a and 40b of the shoe plate 21, the engaging part 4 does not prevent the dirt drainage holes 40a and 40b of the shoe plate 21 from draining dirt or the like. As a result, the dirt or the like can escape from a part between the shoe plate 21 and the links 1a and 1b or the like through the dirt drainage holes 40a and 40b and the crawler 2 can be smoothly driven.

Since the pair of right and left links 1a and 1b, the connection part 3 and the engaging part 4 are integrally constituted, they can be cast by integral molding, thereby to reduce the cost. Furthermore, torsional rigidity is improved because of the integral molding and a quality is enhanced as a product. In addition, the number of independent parts before assembling is small, so that an inventory control can be reduced. Still further, since the pair of right and left links 1a and 1b, and the shoe plate 21 can be assembled or dissembled, they can be easily assembled as the crawler system, and when the shoe plate 21 is damaged or the like, the damaged shoe plate 21 can be easily fixed or exchanged.

Although the concrete embodiment of the crawler system according to the present invention is described above, the present invention is not limited to the above embodiment, and there are various kinds of modifications within the scope-of the present invention. For example, as the link structure, although the links 1a and 1b and the shoe plate 21 can be assembled, or dissembled in the above embodiment, the links 1a and 1b and the shoe plate 21 may be integrated so as not to be separated. In addition, the present invention is not limited to the above configuration of the shoe plate 21 in the above embodiment and various kinds of configurations which are used in the various kinds of construction machines can be used. Furthermore, as a working vehicle in which this crawler system is used, there are various kinds of construction machines such as a hydraulic shovel or a bulldozer or various kinds of agricultural machines such as a rice reaping machine.

What is claimed is:

1. A crawler system comprising a crawler (2) in which pairs of opposed right and left links (1a) (1b) are endlessly connected, each link having a first part on one end, a second part on the other end, and a solid third part connecting the first part and second part, wherein the first part at the one end of the pair of the right and left links (1a) (1b) is connected by a cylindrical connection part (3), the third parts thereof in the longitudinal direction are connected by an engaging part (4) which engages with a concave tooth (29) of concavo-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3).

2. A crawler system comprising a crawler (2) in which pairs of opposed right and left links (1a) (1b) are endlessly connected, each link having a first part on one end, a second part on the other end, and a solid third part connecting the first part and second part, wherein the first part at the one end of the pair of the right and left links (1a) (1b) is connected by a cylindrical connection part (3), the third parts thereof in the longitudinal direction are connected by an engaging part (4) which engages with a concave tooth (29) of concavo-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3), and the connection parts (3) are not in contact with the concavo-convex teeth (28) of the crawler sprocket (27).

3. A crawler system comprising a crawler (2) in which pairs of opposed right and left links (1a) (1b) are endlessly connected, wherein one end of the pair of the right and left links (1a) (1b) is connected by a cylindrical connection part (3), middle parts thereof in the longitudinal direction are connected by an engaging part (4) which engages with a concave tooth (29) of concavo-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3), and an arrangement pitch between the adjacent connection parts (3) in the longitudinal direction is longer than an engagement pitch between the engaging parts (4) in a sprocket engaging part.

4. The crawler system according to claim 3, wherein the engaging part (4) has a face (30) for receiving a shoe plate (21).

5. The crawler system according to claim 3, wherein the engaging part (4) is provided so as not to correspond to dirt drainage holes (40a) (40b) of the shoe plate (21).

6. The crawler system according to claim 3, wherein the connection part (3) is also integrally molded as a portion of said unit.

7. The crawler system according claim 4, wherein the links (1a) (1b) and the shoe plate (21) can be assembled and dissembled.

8. A crawler link structure comprising a pair of opposed right and left links (1a) (1b), each link having a first part on one end, a second part on the other end, and a solid third part connecting the first part and second part, a connection part (3) connecting the first parts at the one end of the pair of right and left links (1a) (1b), and an engaging part (4) connecting the third parts of the pair of opposed right and left links in the longitudinal direction, wherein, the right and left links (1a) (1b) and engaging part (4) are integrally molded as a unit, and the engaging part (4) engages with a concave tooth (29) of concavo-convex teeth (28) of a crawler sprocket (27).

9. A crawler link structure comprising a pair of opposed right and left links (1a) (1b), a connection part (3) connecting one end of the pair of right and left links (1a) (1b), and an engaging part (4) connecting middle parts of the pair of opposed right and left links in the longitudinal direction, wherein, the right and left links (1a) (1b) and engaging part (4) are integrally molded as a unit, and the engaging part (4) engages with a concave tooth (29) of concave-convex teeth (28) of a crawler sprocket (27), wherein the connection part (3) is also integrally molded as a portion of said unit.

10. The crawler link structure according to claim 9, wherein a shaft center of the connection part (3) and a shaft center of the engaging part (4) are shifted in the diameter direction, in a sprocket engaging part such that the connection part (3) in not in contact with the crawler sprocket (27).

11. A crawler system comprising a crawler (2) in which pairs of opposed right and left links (1a) (1b) are endlessly connected, wherein one end of the pair of the right and left links (1a) (1b) is connected by a cylindrical connection part (3), middle parts thereof in the longitudinal direction are connected by an engaging part (4), having a face (30) for receiving a shoe plate (21), which engages with a concave tooth (29) of concave-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3).

12. A crawler system comprising a crawler (2) in which pairs of opposed right and left links (1a) (1b) are endlessly connected, wherein one end of the pair of the right and left links (1a) (1b) is connected by a cylindrical connection part (3), middle parts thereof in the longitudinal direction are connected by an engaging part (4), having a face (30) for receiving a shoe plate (21), which engages with a concave tooth (29) of concave-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3), and the connection parts (3) are not in contact with the concave-convex teeth (28) of the crawler sprocket (27).

13. A crawler system comprising a crawler (2) in which pairs of opposed right and left links (1a) (1b) are endlessly connected, wherein one end of the pair of the right and left links (1a) (1b) is connected by a cylindrical connection part (3), middle parts thereof in the longitudinal direction are connected by an engaging part (4), which engages with a concave tooth (29) of concave-convex teeth (28) of a crawler sprocket (27), the right and left links (1a) (1b) and engaging part (4) integrally molded as unit, and the pairs of right and left links (1a) (1b) are endlessly connected by inserting connection pins (12) to the connection parts (3); wherein the connection part (3) is also integrally molded as a portion of said unit.

14. A crawler system comprising a crawler (2) in which pairs of opposed right and left links (1a) (1b) are endlessly connected, wherein one end of the pair of the right and left links (1a) (1b) is connected by a cylindrical connection part (3), middle parts thereof in the longitudinal direction are connected by an engaging part (4) which engages with a concave tooth (29) of concave-convex teeth (28) of a crawler sprocket (27), the right and left links (1a) (1b) and engaging part (4) integrally molded as a unit, and the pairs of right and left links (1a) (1b) are endlessly connected by inserting connection pins (12) to the connection parts (3), and the connection parts (3) are not in contact with the concave-convex teeth (28) of the crawler sprocket (27).

15. The crawler link structure according to claim 8, wherein a shaft center of the connection part (3) and a shaft center of the engaging part (4) are shifted in the diameter direction, in a sprocket engaging part such that the connection part (3) is not in contact with the crawler sprocket (27).

* * * * *